United States Patent
Choi

(10) Patent No.: US 7,808,208 B2
(45) Date of Patent: Oct. 5, 2010

(54) BATTERY EQUALIZER FOR CARS

(75) Inventor: Deok Kwan Choi, Yongin-si (KR)

(73) Assignee: Hyundai Mobis Co., Ltd., Gyeonggi-Do (KR)

( * ) Notice: Subject to any disclaimer, the term of this patent is extended or adjusted under 35 U.S.C. 154(b) by 311 days.

(21) Appl. No.: 12/175,688

(22) Filed: Jul. 18, 2008

(65) Prior Publication Data

US 2009/0021220 A1    Jan. 22, 2009

(30) Foreign Application Priority Data

Jul. 20, 2007   (KR) ...................... 10-2007-0072941

(51) Int. Cl.
*H02J 7/00* (2006.01)
(52) U.S. Cl. .................................................... 320/119
(58) Field of Classification Search ................. 320/118, 320/119, 122, 124, 134
See application file for complete search history.

(56) References Cited

U.S. PATENT DOCUMENTS

| | | | | |
|---|---|---|---|---|
| 5,479,083 A | * | 12/1995 | Brainard | 320/121 |
| 5,528,122 A | * | 6/1996 | Sullivan et al. | 320/118 |
| 5,982,142 A | * | 11/1999 | Sullivan et al. | 320/118 |
| 6,211,650 B1 | * | 4/2001 | Mumaw et al. | 320/122 |
| 6,841,971 B1 | * | 1/2005 | Spee et al. | 320/119 |
| 7,061,207 B2 | * | 6/2006 | Patel et al. | 320/119 |
| 7,352,154 B2 | * | 4/2008 | Cook | 320/116 |
| 2005/0283291 A1 | | 12/2005 | Whang | |
| 2006/0055242 A1 | | 3/2006 | Lee | |
| 2006/0097673 A1 | | 5/2006 | Jun | |
| 2007/0296269 A1 | | 12/2007 | Jeon | |

\* cited by examiner

*Primary Examiner*—Edward Tso
*Assistant Examiner*—Ramy Ramadan
(74) *Attorney, Agent, or Firm*—Greenblum & Bernstein, P.L.C.

(57) ABSTRACT

There is provided a battery equalizer for cars. The battery equalizer for cars includes a battery module including first and second batteries and a battery equalizer mounted in the battery module to sustain charge voltages of the first and second batteries to be the same. The battery equalizer includes a power converting unit for converting power so that the charge voltages are equally charged in the first and second batteries and a noise preventing unit connected between the power converting unit and an external case to remove conductive noise of the power converting unit and surge noise of the external case.

6 Claims, 3 Drawing Sheets

BATTERY EQUALIZER FOR CARS

BACKGROUND OF THE INVENTION

1. Field of the Invention

The present invention relates to a battery equalizer for cars, and more particularly, to a battery equalizer for cars whose electrical characteristic is improved.

2. Discussion of the Related Art

In general, cars (such as a bus and a truck) have a 24V power source system. A 24V battery module in which a 28V alternator and two 12V batteries are seriously connected to each other is used.

The battery equalizer for cars is mounted in the 24V battery module to sustain the voltage of the two serially connected 12V batteries to be always the same and to supply a power source to a 12V electrical load.

Here, when a 12V power source is used for the 12V batteries without the battery equalizer, in the two 12V batteries, a lower end battery is discharged and an upper end battery is charged. Therefore, balance of the voltage of the two batteries is broken so that the lower end battery is over-discharged and the upper end battery is over-charged.

As a result, it is not possible for the lower end battery to use the power source without the battery equalizer.

The battery equalizer converts the power of a 24V input to control an output to be half of the input and to be connected to the lower end battery. When the 12V load is smaller than the capacity of the battery equalizer in a state where the 24V battery module is connected to the battery equalizer, the voltage of the two batteries is sustained to be always the same.

In a conventional art, the ground of the battery equalizer is connected to a battery ground through a wire.

However, in the conventional battery equalizer for cars, when the ground of the battery equalizer is connected to the battery ground through the long wire, the internal ground of the battery equalizer becomes unstable due to the impedance of the wire, the erroneous operation of a product is caused by internal and external noises, and electrical characteristic test standards are not satisfied.

SUMMARY OF THE INVENTION

In order to solve the above-described problems, it is an object of the present invention to provide a battery equalizer for cars whose electrical characteristic is improved.

In order to achieve the above object, a battery equalizer for cars according to the present invention includes a battery module including first and second batteries and a battery equalizer mounted in the battery module to sustain charge voltages of the first and second batteries to be the same. The battery equalizer includes a power converting unit for converting power so that the charge voltages are equally charged in the first and second batteries and a noise preventing unit connected between the power converting unit and an external case to remove conductive noise of the power converting unit and surge noise of the external case.

The battery equalizer for cars according to the present invention prevents the generation of the conductive noise therein and the generation of the surge noise of the external case so that the electrical characteristic of the battery equalizer can be improved and the generation of erroneous operations caused by the noise can be prevented.

DETAILED DESCRIPTION OF THE PREFERRED EMBODIMENTS

Hereinafter, a battery equalizer for cars according to the present invention will be described in detail with reference to the accompanying drawings.

Figure 1:
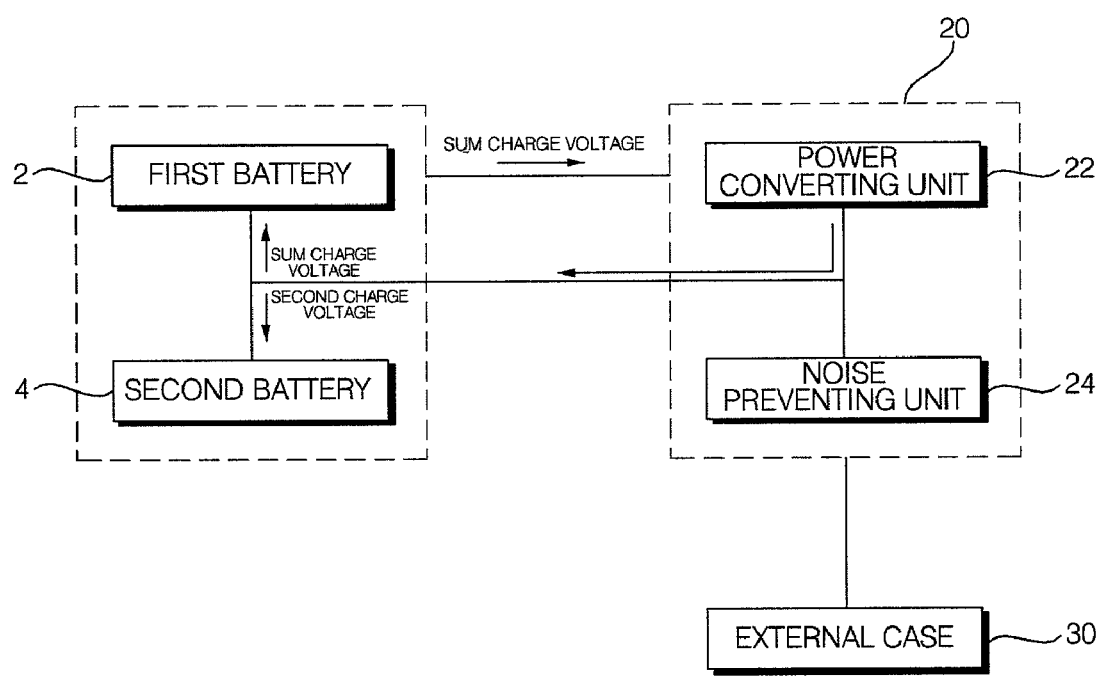
FIG. 1 is a block diagram illustrating a battery equalizer for cars according to the present invention.

FIG. 1 is a block diagram illustrating a battery equalizer for cars according to the present invention.

Referring to FIG. 1, the battery equalizer for cars includes a battery module 10 including first and second serially connected batteries 2 and 4, a battery equalizer 20 for receiving the sum of the first charge voltage of the first battery 2 and the second charge voltage of the second battery 4 to power convert the sum charge voltage into the first and second charge voltages by the first and second batteries 2 and 4, and an external case 30 for functioning as a ground that prevents conductive noise generated inside the battery equalizer 20 and surge noise generated outside the battery equalizer 20.

Here, the battery equalizer 20 receives the sum charge voltage of the first and second batteries 2 and 4 to perform control so that the first and second charge voltages are charged in the first and second batteries 2 and 4.

The battery equalizer 20 includes a power converting unit 22 for converting the sum charge voltage of the first and second batteries 2 and 4 to supply the first and second charge voltages to the first and second batteries 2 and 4 and a noise preventing unit 24 connected between the power converting unit 22 and the external case 30 to remove the conductive noise of the power converting unit 22 and the surge noise of the external case 30.

Hereinafter, detailed description is performed with reference to FIG. 2.

Figure 2:
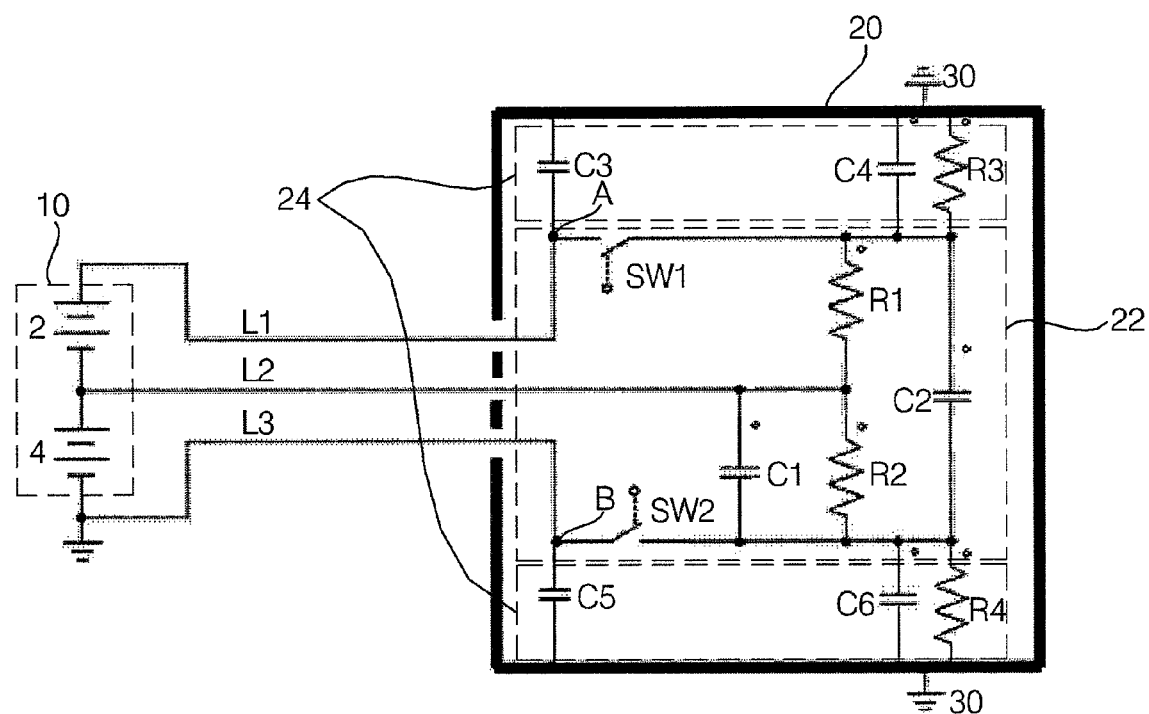
FIG. 2 is a circuit diagram illustrating the battery equalizer for cars of FIG. 1.

FIG. 2 is a circuit diagram illustrating the battery equalizer of FIG. 1.

Referring to FIG. 2, the battery equalizer for cars according to the present invention includes the battery module 10, the battery equalizer 20, and the external case 30.

Here, the external case 30 is displayed by an external ground.

The first and second batteries 2 and 4 are connected to the battery equalizer 20 through first, second, and third lead wires L1, L2, and L3.

The battery equalizer 20 includes the power converting unit 22 connected to the first, second, and third lead wires L1, L2, and L3 to power converting the sum charge voltage of the first and second batteries 2 and 4 and the noise preventing unit 24 connected to the power converting unit 22 and the external case 30 to remove the conductive noise and the surge noise.

Here, the power converting unit 22 includes a first switch SW1 whose one end is connected to the first lead wire L1 at a first contact point A, a first resistor R1 connected between the first switch SW1 and the second lead wire L2, a second resistor R2 connected to the first resistor R1 in parallel in the second lead wire L2 and connected to the third lead wire L3, a first capacitor C1 connected between the second resistor R2 and the second and third lead wires L2 and L3 in parallel, a second capacitor C2 connected to the first and second resistors R1 and R2 in parallel, and a second switch SW2 whose one end is connected to the third lead wire L3 at a second contact point B and whose the other end is connected to the first capacitor C1.

That is, the first and second switches SW1 and SW2 power convert the sum charge voltage applied from the first and second batteries 2 and 4 to charge the first and second charge voltages in the first and second batteries 2 and 4 or form a current path connected to the ground.

The noise preventing unit 24 includes a third capacitor C3 whose one end is connected to the first contact point A and whose the other end is connected to the external case 30, a third resistor R3 whose one end is connected to the second capacitor C2 and whose the other end is connected to the external case, a fourth capacitor C4 connected to the third resistor R3 in parallel, a fifth capacitor C5 whose one end is connected to the second contact point B and whose the other end is connected to the external case 30, a fourth resistor R4 whose one end is connected to the second capacitor C2 and whose the other end is connected to the external case, and a sixth capacitor C6 connected to the fourth resistor R4 in parallel.

Here, the third and fifth capacitors C3 and C5 function as internal grounds and are connected to the external case 30 to transmit radio frequency noise.

In addition, the third resistor R3 and the fourth capacitor C4 are formed of an RC filter to prevent the conductive noise and the surge noise.

Figure 3:
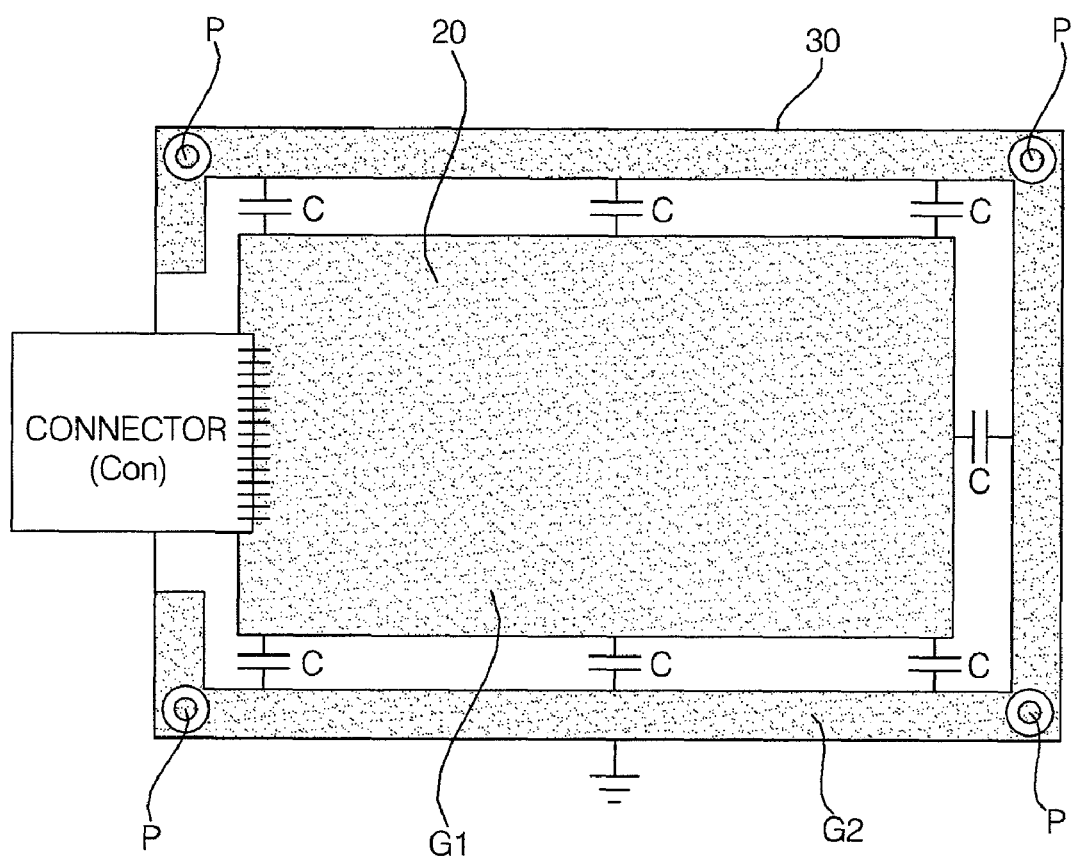
FIG. 3 illustrates the battery equalizer for cars of FIG. 1 using a printed circuit board (PCB).

FIG. 3 illustrates the battery equalizer for cars of FIG. 1 using a printed circuit board (PCB).

Referring to FIG. 3, in the battery equalizer for cars, the internal ground G1 of the battery equalizer 20 is formed, the external case 30 is connected by a bolt and a fastening member P around the internal ground G1 to be used as an external ground G2, a connector CON connected to an external power source circuit is connected to the internal ground G1.

In addition, the internal ground G1 and the external ground G2 are connected to each other by at least one capacitor to shield the conductive noise generated inside the battery equalizer 20 and the surge noise received from the external case 30.

In the battery equalizer for cars according to the present invention, in order to shield the conductive noise generated inside the battery equalizer and the surge noise received from the external case, at least capacitor and at least one resistor are connected between the external case and the power converting unit to remove the conductive noise and the surge noise emitted from the inside to the outside and to rapidly shield external noise.

Although embodiments of the present invention have been described with reference to drawings, these are merely illustrative, and those skilled in the art will understand that various modifications and equivalent other embodiments of the present invention are possible. Consequently, the true technical protective scope of the present invention must be determined based on the technical spirit of the appended claims.

What is claimed is:

1. A battery equalizer for cars, comprising:
   a battery module comprising first and second batteries; and
   a battery equalizer mounted in the battery module to sustain charge voltages of the first and second batteries to be the same,
   wherein the battery equalizer comprises:
   a power converting unit for converting power so that the charge voltages are equally charged in the first and second batteries; and
   a noise preventing unit connected between the power converting unit and an external case to remove conductive noise of the power converting unit and surge noise of the external case,
   wherein the power converting unit comprises:
   a first switch connected to one end of the first battery through a first lead wire at a first contact point;
   a first resistor connected to a second lead wire between the first switch and the other end of the first battery or one end of the second battery;
   a second resistor connected to the first resistor in parallel in the second lead wire and connected to the other end of the second battery through a third lead wire;
   a first capacitor connected between the second resistor and the second and third lead wires in parallel;
   a second capacitor connected to the first and second resistors in parallel; and
   a second switch connected to the third lead wire at a second contact point and connected to the first capacitor.

2. The battery equalizer for cars of claim 1, wherein the first and second batteries are connected to the power converting unit in parallel so that the charge voltages are charged, respectively.

3. The battery equalizer for cars of claim 1, wherein the first and second batteries are serially connected to each other.

4. The battery equalizer for cars of claim 1, wherein the noise preventing unit comprises:
   at least one capacitor connected between the power converting unit and the external case; and
   at least one resistor connected to at least one capacitor in parallel.

5. The battery equalizer for cars of claim 4, wherein the at least one resistor is a discharge resistor connected to the at least one capacitor in parallel.

6. The battery equalizer for cars of claim 1, wherein the noise preventing unit is an RC filter for shielding radio frequency noise.

* * * * *